US012288966B2

(12) United States Patent
Lee et al.

(10) Patent No.: US 12,288,966 B2
(45) Date of Patent: Apr. 29, 2025

(54) BOGIE APPARATUS AND CIRCUIT BREAKER COMPRISING SAME

(71) Applicant: LS ELECTRIC CO., LTD., Anyang-si (KR)

(72) Inventors: Han-Joo Lee, Anyang-si (KR); Hong-Ik Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 96 days.

(21) Appl. No.: 18/272,145

(22) PCT Filed: Nov. 25, 2021

(86) PCT No.: PCT/KR2021/017456
§ 371 (c)(1),
(2) Date: Jul. 13, 2023

(87) PCT Pub. No.: WO2022/220362
PCT Pub. Date: Oct. 20, 2022

(65) Prior Publication Data
US 2024/0079860 A1 Mar. 7, 2024

(30) Foreign Application Priority Data
Apr. 13, 2021 (KR) .................. 10-2021-0047566

(51) Int. Cl.
*H02B 11/167* (2006.01)
*H01H 71/52* (2006.01)
*H01R 13/631* (2006.01)

(52) U.S. Cl.
CPC ......... *H02B 11/167* (2013.01); *H01H 71/522* (2013.01); *H01R 13/6315* (2013.01)

(58) Field of Classification Search
CPC ... H02B 11/167; H01R 13/6315; H01R 12/91
See application file for complete search history.

(56) References Cited

U.S. PATENT DOCUMENTS 5,385,481 A * 1/1995 Kotyuk ............... H05K 7/1454
439/378
5,391,091 A * 2/1995 Nations ............. H01R 12/7047
439/378
(Continued)

FOREIGN PATENT DOCUMENTS

KR 20100102488 A 9/2010
KR 20110106737 A 9/2011
(Continued)

OTHER PUBLICATIONS

International Search Report for related International Application No. PCT/KR2021/017456; action dated Oct. 20, 2022; (2 pages).
(Continued)

*Primary Examiner* — Robert J Hoffberg
(74) *Attorney, Agent, or Firm* — K&L Gates LLP

(57) ABSTRACT

One embodiment of a bogie apparatus may comprise: a horizontal frame; vertical frames respectively coupled to both ends of the horizontal frame and provided in a pair; an end bar having both end parts respectively coupled to one end of the pair of horizontal frames; and a connector assembly coupled to the end bar so as to move in at least one direction among upward, downward, left, and right directions. The connector assembly may comprise: a socket portion having a plurality of wiring terminals; a socket mounting portion having the socket portion mounted thereon, and provided in a plate shape; and a guide bushing formed so as to protrude from the socket mounting portion and away from the socket portion, and having a hollow.

9 Claims, 9 Drawing Sheets

(56) References Cited

U.S. PATENT DOCUMENTS

| | | | | |
|---|---|---|---|---|
| 5,514,000 | A * | 5/1996 | Krause | H01R 13/743 439/248 |
| 5,622,511 | A * | 4/1997 | Jarrett | H01R 13/6315 439/378 |
| 5,993,241 | A * | 11/1999 | Olson | G06F 1/189 439/378 |
| 6,358,075 | B1 * | 3/2002 | Tischner | H01R 13/6315 439/248 |
| 6,864,444 | B2 * | 3/2005 | Anger | H02B 11/127 200/50.01 |
| 7,078,634 | B2 * | 7/2006 | Anger | H02B 11/127 200/50.21 |
| 7,419,394 | B2 * | 9/2008 | Jensen | H01R 13/6315 439/924.1 |
| 7,684,201 | B2 * | 3/2010 | Bailey | H05K 7/1454 439/378 |
| 8,894,431 | B2 * | 11/2014 | Tiberghien | H01R 13/6315 439/247 |
| 10,541,519 | B1 * | 1/2020 | Wavering | H01R 13/6315 |
| 10,965,052 | B2 * | 3/2021 | Shikanai | F16C 41/04 |
| 2012/0228095 | A1 | 9/2012 | Kutsche et al. | |
| 2018/0087311 | A1 | 3/2018 | Kendall | |

FOREIGN PATENT DOCUMENTS

| | | |
|---|---|---|
| KR | 101528602 B1 | 6/2015 |
| KR | 101759603 B1 | 7/2017 |

OTHER PUBLICATIONS

Written Opinion for related International Application No. PCT/KR2021/017456; action dated Oct. 20, 2022; (4 pages).

* cited by examiner

BOGIE APPARATUS AND CIRCUIT BREAKER COMPRISING SAME

CROSS-REFERENCE TO RELATED APPLICATIONS

The present application is a National Stage of International Application No. PCT/KR2021/017456 filed on Nov. 25, 2021, which claims priority to and the benefit of Korean Utility Model Application No. 10-2021-0047566, filed Apr. 2021, the disclosures of which are incorporated herein by reference in its entirety.

FIELD

The present disclosure relates to a bogie apparatus and a circuit breaker including the same, and more particularly, to a bogie apparatus having an improved coupling structure and a circuit breaker including the same.

BACKGROUND

Content described in this section merely provided background information on the present disclosure and does not constitute the related art.

In general, circuit breakers are installed in high-voltage power systems and configured to protect the power systems by breaking circuits when dangerous situations such as short circuit and overcurrent occur and are designed using excellent insulation performance and excellent arc extinguishing power in a vacuum state.

The circuit breakers are installed on switchboards in which various electrical devices are installed and managed to operate or control power plants and substations and are generally accommodated and used inside cradles fixed to the switchboard. In this case, the circuit breaker may be generally provided as a vacuum circuit breaker.

Inside the switchboard, terminals of the circuit breakers have connected positions at which the terminals are connected to load terminals of the cradles to supply voltages and currents and test positions at which the terminals are separated from terminals of the cradles and only operation tests of the circuit breakers may be performed.

Meanwhile, a mechanical operated cell (MOC) switch that displays an ON/OFF state of the circuit breaker is mounted on the cradle of the switchboard. When the circuit breaker is located in the test position, an operation of the circuit breaker is tested or checked, and when the circuit breaker is in the connected position, peripheral devices may be operated using a contact output of the MOC switch or interlocking therebetween may be implemented, thereby securing stability of operation of the circuit breaker.

In this way, the circuit breaker may be extracted to the outside or inserted into the cradle for maintenance or other purposes. Thus, in order to move the circuit breaker relative to the cradle, the circuit breaker may be provided with a bogie apparatus.

The bogie apparatus is provided with a connector for electrical connection with other component provided in the cradle.

The connector of the bogie apparatus and a connector of the other component may have a plurality of male structures and a plurality of female structures, and when the plurality of male structures and the plurality of female structures are vertically misaligned with each other, it is difficult to couple the male structures and the female structures only by a horizontal movement of the bogie apparatus.

A solution for this is required.

SUMMARY

The present disclosure is directed to providing a bogie apparatus provided in a circuit breaker having a structure that facilitates electrical connection with an external component.

The present disclosure is directed to also providing a circuit breaker provided with the bogie apparatus and having a structure mounted on a cradle.

The purposes of the present disclosure may be not limited to the purposes described above, and other purposes and advantages of the present disclosure that are not described may be understood by the following description and may be more clearly understood by embodiments of the present disclosure. Further, it may be easily identified that the purposes and advantages of the present disclosure may be implemented by units and combinations thereof described in the appended claims.

One aspect of the present disclosure provides a bogie apparatus including a transverse frame, a pair of longitudinal frames coupled to both ends of the transverse frame, an end bar having both ends coupled to ends of the longitudinal frames, and a connector assembly coupled to the end bar to be movable in at least one direction among an upward direction, a downward direction, a leftward direction, and a rightward direction.

The connector assembly may include a socket part in which a plurality of wiring terminals are provided, a socket mounting part on which the socket part is mounted and which is provided in a plate shape, and a guide bush formed to protrude from the socket mounting part at a position spaced apart from the socket part and having a hollow.

A socket mounting hole on which the socket part is mounted may be formed in the end bar, and a length of the socket mounting hole in the upward direction and the downward direction may be greater than a length of the socket part in the upward direction and the downward direction.

The connector assembly may further include a connection plate formed to protrude rearward from the socket mounting part, and a connector bracket having one end coupled to the connection plate and the other end coupled to a connector coupling part formed to protrude from a bottom surface of the bogie apparatus.

The connector bracket may include a first piece coupled to the connection plate, a second piece bent from the first piece, and a third piece bent from the second piece, having a lengthwise direction that is parallel to a front-rear direction of the bogie apparatus, and having an end coupled to the connector coupling part.

A coupling part insertion hole may be formed in the third piece, and an upper end of the connector coupling part may be inserted into the coupling part insertion hole.

The connector assembly may further include an elastic part having one end coupled to the second piece, the other end coupled to the connector coupling part, and having a lengthwise direction that is disposed in the lengthwise direction of the third piece.

A bush mounting hole through which the guide bush is disposed to pass may be formed in the end bar, and the bush mounting hole may be formed as a slot hole in which a diameter of the end bar in a vertical direction is greater than a diameter of the end bar in a left-right direction.

The guide bush may include a first mounting portion protruding forward from the socket mounting part, and a second mounting portion protruding rearward from the socket mounting part, and the second mounting portion may be inserted into the bush mounting hole.

At least a portion of the socket mounting part of the connector assembly may be in contact with an outer surface of the end bar, and the connector assembly may be mounted on the bogie apparatus to be movable relative to the end bar in the upward direction and the downward direction.

Another aspect of the present disclosure provides a circuit breaker including a body and the bogie apparatus coupled to a lower portion of the body, wherein the bogie apparatus further includes a roller coupled to outer sides of the pair of longitudinal frames to be rotatable with respect to the longitudinal frames.

In a coupling structure of a connector assembly to a bogie apparatus by an elastic part, a structure that restrains a vertical movement of the connector assembly is not provided. Thus, the connector assembly may move by a predetermined distance in a vertical direction of the bogie apparatus while coupled to the bogie apparatus by the elastic part.

Due to this structure, the connector assembly can be easily coupled and electrically connected to a coupling assembly provided in the outside.

In the bogie apparatus according to the present disclosure, the connector assembly is provided to be movable in the vertical direction on the bogie apparatus. Thus, even when the connector assembly and the coupling assembly are misaligned with each other in the vertical direction, the connector assembly and the coupling assembly can be smoothly coupled.

In addition to the above-described effects, the detailed effects of the present disclosure will be described together while specific details for implementing the disclosure are described below.

DETAILED DESCRIPTION

Figure 1:
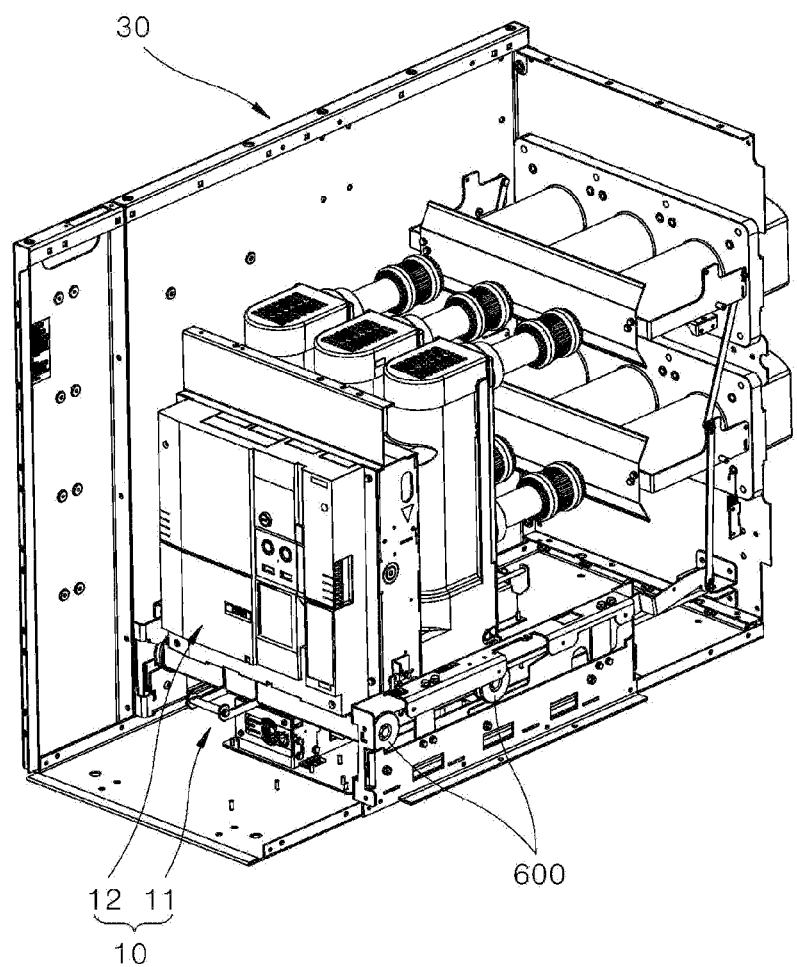
FIG. 1 is a perspective view illustrating a circuit breaker according to an embodiment.

The above-described purposes, features, and advantages will be described in detail with reference to the accompanying drawings, and accordingly, those skilled in the art to which the present disclosure pertains may easily implement the technical spirit of the present disclosure. In the description of the present disclosure, when it is determined that a detailed description of widely known technologies related to the present disclosure may make the subject matter of the present disclosure unclear, the detailed description be omitted. Hereinafter, embodiments of the present disclosure will be described in detail with reference to the accompanying drawings. In the drawings, the same reference numerals are used to indicate the same or similar components.

Although terms such as first and second are used to describe various components, it is apparent that these components are not limited by these terms. These terms are only used to distinguish one component from another component, and it is apparent that a first component may be a second component unless particularly otherwise stated.

Throughout the specification, unless particularly otherwise stated, each component may be singular or plural.

Singular expressions used herein include plural expressions unless clearly otherwise indicated in the context. In the present application, terms such as "configuring" or "including" should not be interpreted as necessarily including all of various components or various steps described in the specification and should be interpreted as not including some components or some steps thereof or further including additional components or additional steps.

Throughout the specification, when "A and/or B" is used, this means A, or B or A and B unless otherwise stated, and when "C to D" is used, this means that a value is greater than or equal to C and less than or equal to D unless otherwise stated.

FIG. 1 is a perspective view illustrating a circuit breaker 10 according to an embodiment. The circuit breaker 10 may be mounted to be accommodated inside a cradle 30 provided in a switchboard. The circuit breaker 10 may include a body 12 and a bogie apparatus 11 coupled to a lower portion of the body 12 and provided to be movable relative to the cradle 30.

The circuit breaker 10 may be in a blocking state, a test state, and a connection state. In the blocking state, the circuit breaker 10 may be in a power-off state, and in the test state and the connection state, the circuit breaker 10 may be in a power-on state. When in the energized state, the circuit breaker 10 is in an insertion state.

A position of the circuit breaker 10 may be implemented as the bogie apparatus 11 moves relative to the cradle 30. That is, the bogie apparatus 11 may be provided to move relative to the cradle 30. A worker may move the bogie apparatus 11 to insert the circuit breaker 10 into the cradle 30 or extract the circuit breaker 10 from the cradle 30.

Figure 2:
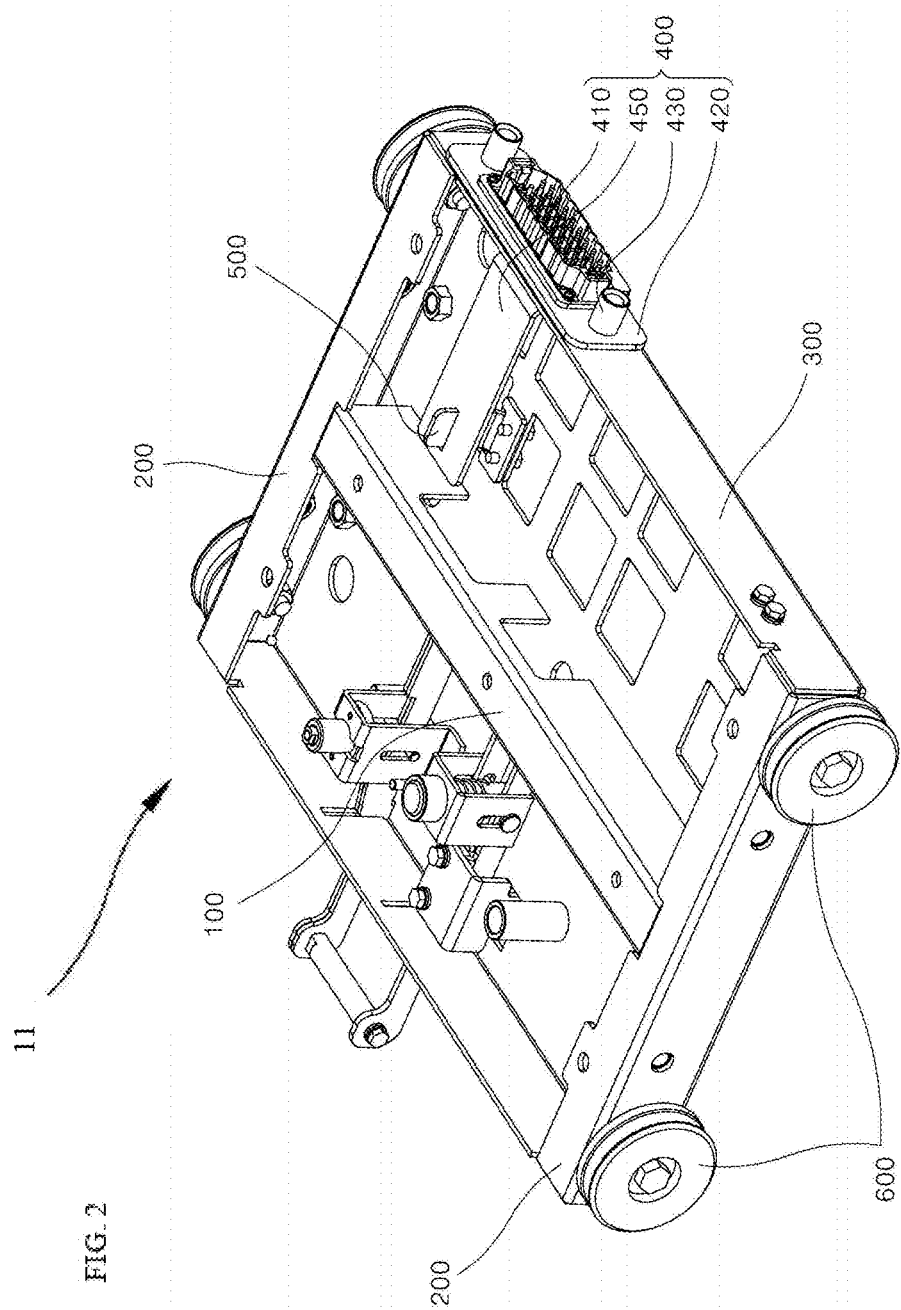
FIG. 2 is a perspective view illustrating a bogie apparatus according to the embodiment.

FIG. 2 is a perspective view illustrating the bogie apparatus 11 according to the embodiment. The bogie apparatus 11 may include a transverse frame 100, a longitudinal frame 200, an end bar 300, and a connector assembly 400.

The transverse frame 100 may be coupled to the longitudinal frame 200 to form the entire frame of the bogie apparatus 11.

The longitudinal frame 200 may be provided as a pair of longitudinal frames 200, which are coupled to both ends of the transverse frame 100. The longitudinal frame 200 may be coupled to the transverse frame 100 to form the entire frame of the bogie apparatus 11.

The end bar 300 may have both ends connected to ends of the pair of longitudinal frames 200. The end bar 300 together with the transverse frame 100 and the longitudinal frame 200 may form the frame of the bogie apparatus 11.

The connector assembly 400 may be coupled to the end bar 300 to be movable in at least one direction among an upward direction, a downward direction, a leftward direction, and a rightward direction, may be coupled to a coupling assembly 1000 provided in the cradle 30 and provided outside the bogie apparatus 11, and may be electrically connected to the coupling assembly 1000.

The bogie apparatus 11 may further include a roller 600. The roller 600 may be coupled to outer sides of the pair of longitudinal frames 200 to be rotatable with respect to the longitudinal frames 200. In this case, the roller 600 may be provided as a plurality of rollers 600 arranged in a lengthwise direction of the longitudinal frame 200.

The cradle 30 may be provided with a guide rail that guides movement of the roller 600, and the roller 600 may be detachably mounted on the guide rail.

Figure 3:
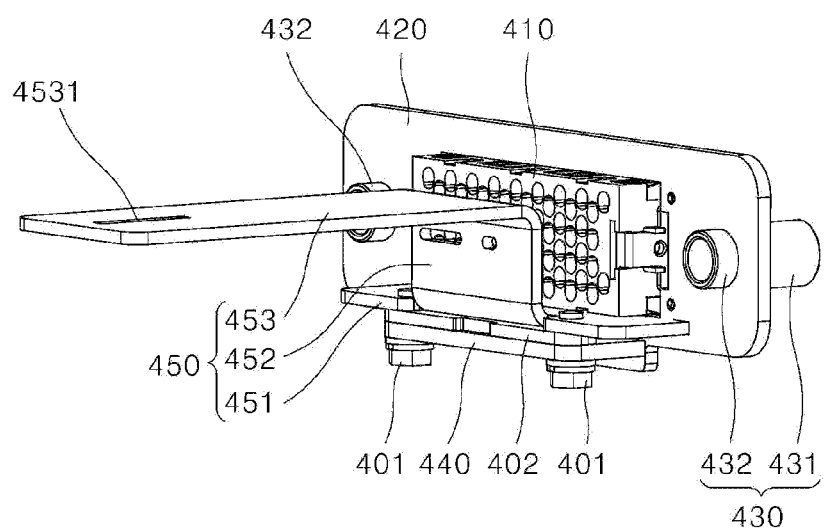
FIG. 3 is a perspective view illustrating a connector assembly according to the embodiment.
Figure 4:
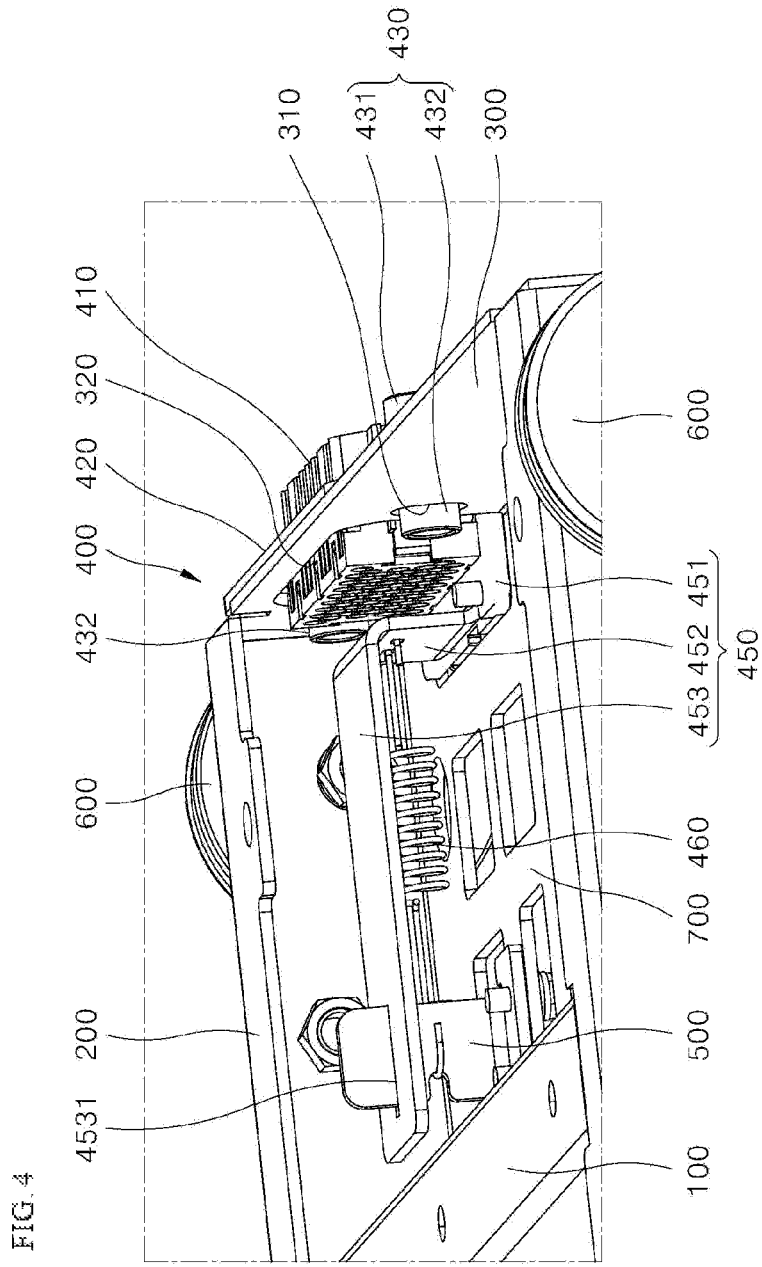
FIG. 4 is a perspective view illustrating a portion of the bogie apparatus on which the connector assembly is mounted according to the embodiment.

FIG. 3 is a perspective view illustrating the connector assembly 400 according to the embodiment. FIG. 4 is a perspective view illustrating a portion of the bogie apparatus 11 on which the connector assembly 400 is mounted according to the embodiment.

Figure 5:
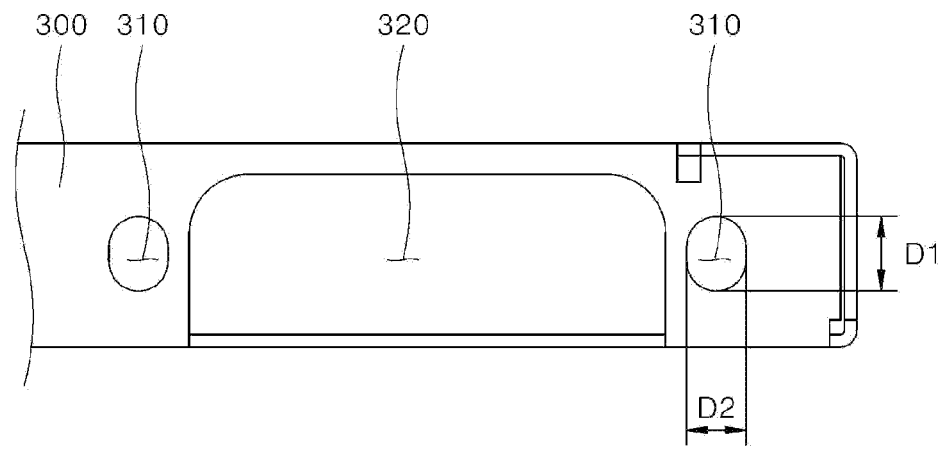
FIG. 5 is a front view of a portion of an end bar according to the embodiment.
Figure 6:
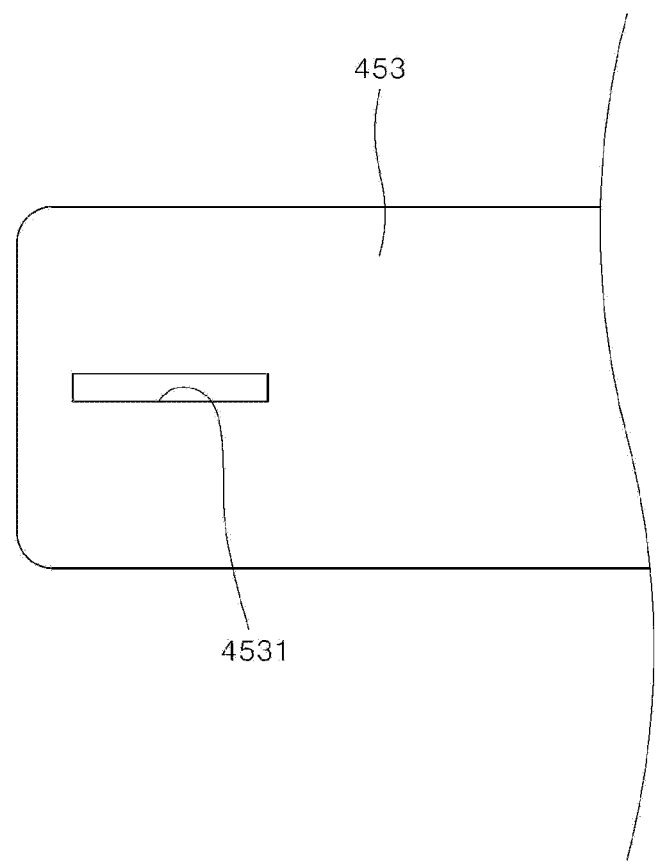
FIG. 6 is a view illustrating a portion of a connector bracket according to the embodiment.

FIG. 5 is a front view of a portion of the end bar 300 according to the embodiment. FIG. 6 is a view illustrating a portion of a connector bracket 450 according to the embodiment.

The connector assembly 400 may include a socket part 410, a socket mounting part 420, and a guide bush 430.

The socket part 410 may be provided with a plurality of wiring terminals. The socket part 410 may be coupled to a coupling socket 1100 provided in the coupling assembly 1000 disposed outside the bogie apparatus 11. In the drawings, to clearly illustrate a structure of the bogie apparatus 11, illustration of a wiring line electrically connected to the socket part 410 and the coupling socket 1100 is omitted.

The coupling socket 1100 may be provided with a plurality of wiring terminals corresponding to the socket part 410. When the socket part 410 and the coupling socket 1100 are coupled to each other, the connector assembly 400 and the coupling assembly 1000 may be electrically conducted to each other.

The socket part 410 and the coupling socket 1100 may have a structure in which the socket part 410 and the coupling socket 1100 are detachably coupled to each other. For example, the wiring terminals of the socket part 410 are formed as male wiring terminals, the wiring terminals of the coupling socket 1100 are formed as female wiring terminals, and thus the socket part 410 and the coupling socket 1100 may be coupled to each other or separated from each other easily.

The socket part 410 may be mounted on the socket mounting part 420, and the socket mounting part 420 may be provided in a plate shape. The socket part 410 may have a structure passing through the socket mounting part 420 and may be fixedly mounted on the socket mounting part 420.

When the connector assembly 400 is mounted on the end bar 300, one surface of the socket mounting part 420 may be in contact with one surface of the end bar 300. Due to this structure, the connector assembly 400 may be stably mounted on the bogie apparatus 11 provided with the end bar 300 by the socket mounting part 420.

The guide bush 430 may protrude from the socket mounting part 420 at a position spaced apart from the socket part 410 and may have a hollow shape. The guide bush 430 may be fixedly coupled to the socket mounting part 420.

The guide bush 430 may be formed such that a lengthwise direction thereof is directed to a front-rear direction of the socket mounting part 420, and for example, may be formed as a pair of guide bushes 430. The pair of guide bushes 430 may be formed at positions spaced a predetermined distance from both sides of the socket part 410, respectively. A hollow provided in the guide bush 430 may pass through the socket mounting part 420 and may be formed in the front-rear direction of the socket mounting part 420.

The guide bush 430 may include a first mounting portion 431 and a second mounting portion 432. The first mounting portion 431 may protrude forward from the socket mounting part 420. The second mounting portion 432 may protrude rearward from the socket mounting part 420. In this case, the hollow provided in the guide bush 430 may pass through the first mounting portion 431, the socket mounting part 420, and the second mounting portion 432.

A coupling pin 1200 may be formed at a position corresponding to the guide bush 430 in the coupling assembly 1000. The coupling pin 1200 may be provided as a pair of coupling pins 1200 which are formed at positions spaced a predetermined distance from both sides of the coupling socket 1100, respectively.

The coupling pin 1200 may be formed in a protruding structure to face the guide bush 430. The guide bush 430 and the coupling pin 1200 may serve as guides for aligning positions between the socket part 410 of the connector assembly 400 and the coupling socket 1100 of the coupling assembly 1000.

A tip of the coupling pin 1200 may be formed sharp. Thus, even when the coupling pin 1200 and the hollow of the guide bush 430 are slightly misaligned in an up-down direction or a left-right direction, the coupling pin 1200 may be easily fitted in the guide bush 430.

When the coupling pin 1200 is fitted in the hollow of the guide bush 430, the socket part 410 and the coupling socket 1100 may be aligned at a position in which the socket part 410 and the coupling socket 1100 may be smoothly coupled to each other. Continuously, when the coupling pin 1200 is more deeply fitted in the guide bush 430, the socket part 410 and the coupling socket 1100 may be smoothly coupled to each other at an aligned position.

A bush mounting hole 310 and a socket mounting hole 320 may be formed in the end bar 300. The guide bush 430 may be disposed to pass through the bush mounting hole 310. For example, since the guide bush 430 may be formed to have an outer circumference of which a cross section is circular, the bush mounting hole 310 may also be formed to have a substantially circular cross section.

The second mounting portion 432 may be provided to be inserted into the bush mounting hole 310. Thus, the connector assembly 400 may be coupled to the end bar 300 in a state in which the second mounting portion 432 is inserted into the bush mounting hole 310, the socket part 410 is inserted into the socket mounting hole 320, and the one surface of the end bar 300 is in contact with the one surface of the socket mounting part 420.

The socket part 410 may be mounted on the socket mounting hole 320. For example, since the socket part 410 may be formed to have a substantially quadrangular cross section, the socket mounting hole 320 may also be formed to have a substantially quadrangular cross section.

The bush mounting hole 310 and the socket mounting hole 320 may be arranged to have positions corresponding to the guide bush 430 and the socket part 410. Thus, the bush mounting hole 310 may be provided as a pair of bush mounting holes 310, and the bush mounting holes 310 may be arranged at positions spaced a predetermined distance from both sides of the socket mounting hole 320, respectively.

A diameter D2 of the bush mounting hole 310 in the left-right direction may be greater than an outer diameter of the second mounting portion 432. Further, a width of the socket mounting hole 320 in the left-right direction may be formed to be greater than a width of the socket part 410 in the left-right direction.

Due to this structure, the connector assembly 400 may freely move within a predetermined range in the left-right direction of the end bar 300. Accordingly, even when the guide bush 430 and the coupling pin 1200 are slightly misaligned in a left-right direction of the circuit breaker 10, the connector assembly 400 and the coupling assembly 1000 may be smoothly coupled to each other.

The connector assembly 400 may further include a connection plate 440 and a connector bracket 450. The connection plate 440 may protrude rearward from the socket mounting part 420. The connection plate 440 may be fixedly coupled to the socket mounting part 420 of the connector assembly 400. In this case, the connection plate 440 and the socket mounting part 420 may be integrally formed.

One end of the connector bracket 450 may be coupled to the connection plate 440, and the other end thereof may be coupled to a connector coupling part 500.

The bogie apparatus 11 may further include a bottom frame 700 coupled to lower sides of the transverse frame 100 and the longitudinal frame 200. An upper surface of the bottom frame 700 may form a bottom surface of the bogie apparatus 11. The connector coupling part 500 may protrude from the bottom surface of the bogie apparatus 11.

The connector coupling part 500 may be formed integrally with the bottom surface of the bogie apparatus 11 or may be manufactured separately from the bogie apparatus 11 and thus installed on the bottom surface of the bogie apparatus 11 by an appropriate coupling mechanism.

The connector coupling part 500 may protrude from the bottom surface of the bogie apparatus 11 so that a lengthwise direction thereof is disposed in a vertical direction of the bogie apparatus 11. The connector bracket 450 may be coupled to an upper end of the connector coupling part 500.

The connector bracket 450 may be coupled to the connection plate 440 and thus coupled to the connector assembly 400. That is, a first piece 451 of the connector bracket 450 may be fastened to the connection plate 440 by a coupling bolt 401.

Referring to FIG. 3, a washer 402 is mounted between the first piece 451 and the connection plate 440, the coupling bolt 401 is fastened to pass through the first piece 451, the washer 402, and the connection plate 440, and thus the connector bracket 450 and the connection plate 440 may be coupled to each other.

Meanwhile, a head portion of the coupling bolt 401 may protrude downward from the bogie apparatus 11, and accordingly, may interfere with the bottom frame 700 forming the bottom surface of the bogie apparatus 11.

Thus, an appropriate shelter structure that can remove interference with the coupling bolt 401 may be formed at a position of the bottom frame 700, corresponding to a position in which the coupling bolt 401 is disposed when the connector assembly 400 is mounted on the bogie apparatus 11.

The connector bracket 450 may include the first piece 451, a second piece 452, and a third piece 453. The first piece 451, the second piece 452, and the third piece 453 may be formed integrally. As described above, the first piece 451 may be coupled to the connection plate 440.

The second piece 452 may be formed to be bent from the first piece 451. The second piece 452 may be bent toward an upper side of the bogie apparatus 11, thereby forming a structure in which the third piece 453 may be coupled to the upper end of the connector coupling part 500.

The third piece 453 may be bent from the second piece 452, a lengthwise direction of the third piece 453 may be parallel to a front-rear direction of the bogie apparatus 11, and an end of the third piece 453 may be coupled to the connector coupling part 500.

A coupling part insertion hole 4531 may be formed in the third piece 453, and the upper end of the connector coupling part 500 may be inserted into the coupling part insertion hole 4531. The coupling part insertion hole 4531 may be formed in a shape corresponding to a cross section of the connector coupling part 500, for example, in a slit shape.

In this case, a length of the coupling part insertion hole 4531 in the front-rear direction of the bogie apparatus 11 may be greater than a length of the upper end of the connector coupling part 500 in the front-rear direction of the bogie apparatus 11.

Due to this structure, the third piece 453 may be easily fitted to the upper end of the connector coupling part 500, and the entire connector assembly 400 may move in the front-rear direction of the bogie apparatus 11 with respect to the connector coupling part 500 to some extent.

The connector assembly 400 is loosely coupled to the connector coupling part 500 and the end bar 300, and in this state, the connector assembly 400 may move in the front-rear direction of the bogie apparatus 11. In this case, an elastic part 460 is coupled to the bogie apparatus 11, and thus the connector assembly 400 may be tightly mounted on the bogie apparatus 11.

The connector assembly 400 may further include the elastic part 460. One end of the elastic part 460 may be coupled to the second piece 452, the other end thereof may be coupled to the connector coupling part 500, and a lengthwise direction thereof may be disposed in the lengthwise direction of the third piece 453. In this case, the elastic part 460 may be provided as, for example, a tension spring.

In order to couple the one end of the elastic part 460 to the second piece 452, holes may be formed in the second piece 452. A hook formed in the one end of the elastic part 460 is inserted into the hole, and thus the elastic part 460 may be coupled to the second piece 452.

Further, in order to couple the other end of the elastic part 460 to the connector coupling part 500, a recessed portion may be formed in the connector coupling part 500. A hook formed at the other end of the elastic part 460 is mounted on the recessed portion, and thus the elastic part 460 may be coupled to the connector coupling part 500.

The elastic part 460 may tighten and elastically maintain a state in which the connector assembly 400 is coupled to the connector coupling part 500 and the end bar 300. The elastic part 460 may pull the second piece 452 of the connector assembly 400 and the connector coupling part 500 together with an elastic force.

Due to this structure, the one surface of the socket mounting part 420 of the connector assembly 400 may be in close contact with the one surface of the end bar 300, and due to this close contact, the connector assembly 400 may be tightly coupled to the end bar 300.

In a coupling structure of the connector assembly 400 to the bogie apparatus 11 by the elastic part 460, a structure of restraining a vertical movement of the connector assembly 400 is not provided. Thus, the connector assembly 400 may move in the vertical direction of the bogie apparatus 11 by a predetermined distance while coupled to the bogie apparatus 11 by the elastic part 460.

Due to this structure, the connector assembly 400 may be easily coupled to the coupling assembly 1000 provided in the outside and electrically connected thereto. A description related thereto will be made below in detail.

In order to smoothly and easily couple the connector assembly 400 of the bogie apparatus 11 and the coupling assembly 1000 provided outside the bogie apparatus 11 to each other, the connector assembly 400 and the coupling assembly 1000 should be located at positions corresponding to each other in the vertical direction of the circuit breaker 10.

However, due to the structure of the circuit breaker 10, the structure of the cradle 30 on which the coupling assembly 1000 is mounted, and a machining tolerance, the connector assembly 400 and the coupling assembly 1000 may not be located at the positions corresponding to each other in the vertical direction and be misaligned with each other.

That is, the connector assembly 400 may be located at a slightly higher position or a slightly lower position in the vertical direction of the circuit breaker 10 with respect to the coupling assembly 1000 at a facing position.

In order to smoothly and easily couple the connector assembly 400 and the coupling assembly 1000 to each other even in the misaligned state, the connector assembly 400 may move by a predetermined distance in the vertical direction even in a state in which the connector assembly 400 is coupled to the bogie apparatus 11.

Thus, in the bogie apparatus 11 according to the embodiment, in the connector assembly 400, at least a portion of the socket mounting part 420 may be in contact with an outer surface of the end bar 300, and the connector assembly 400 may be mounted on the bogie apparatus 11 to be vertically movable relative to the end bar 300.

The structure in which the connector assembly 400 is in contact with the outer surface of the end bar 300 has been described above. Hereinafter, a structure in which the connector assembly 400 is movable in the vertical direction will be described.

Referring to FIG. 5, a vertical length of the socket mounting hole 320 may be greater than a vertical length of the socket part 410. The vertical length of the socket mounting hole 320 may be appropriately selected in consideration of a vertical movement distance of the socket part 410.

Due to this structure, the socket mounting hole 320 may move by a predetermined distance in the vertical direction of the circuit breaker 10 while mounted on the socket part 410.

Further, the bush mounting hole 310 may be formed in a slot hole in which a diameter of the end bar 300 in the vertical direction is greater than a diameter of the end bar 300 in the left-right direction. The bush mounting hole 310 may be formed in a substantially closed curve shape to correspond to an outer shape of the guide bush 430 and may be formed in a slot hole for the vertical movement of the guide bush 430.

A diameter D1 of the bush mounting hole 310 in the vertical direction may be greater than the diameter D2 of the bush mounting hole 310 in the left-right direction. A size of the diameter of the bush mounting hole 310 in the vertical direction may be appropriately selected in consideration of a vertical movement distance of the guide bush 430.

Meanwhile, as described above, with regard to the connector assembly 400 tightly mounted on the bogie apparatus 11 by the elastic part 460, the elastic part 460 does not restrain the vertical movement of the connector assembly 400 in the vertical direction of the circuit breaker 10.

Due to this structure, the connector assembly 400 may move within a range of a predetermined distance in the vertical direction with respect to the end bar 300 even while mounted on the bogie apparatus 11.

Figure 7:
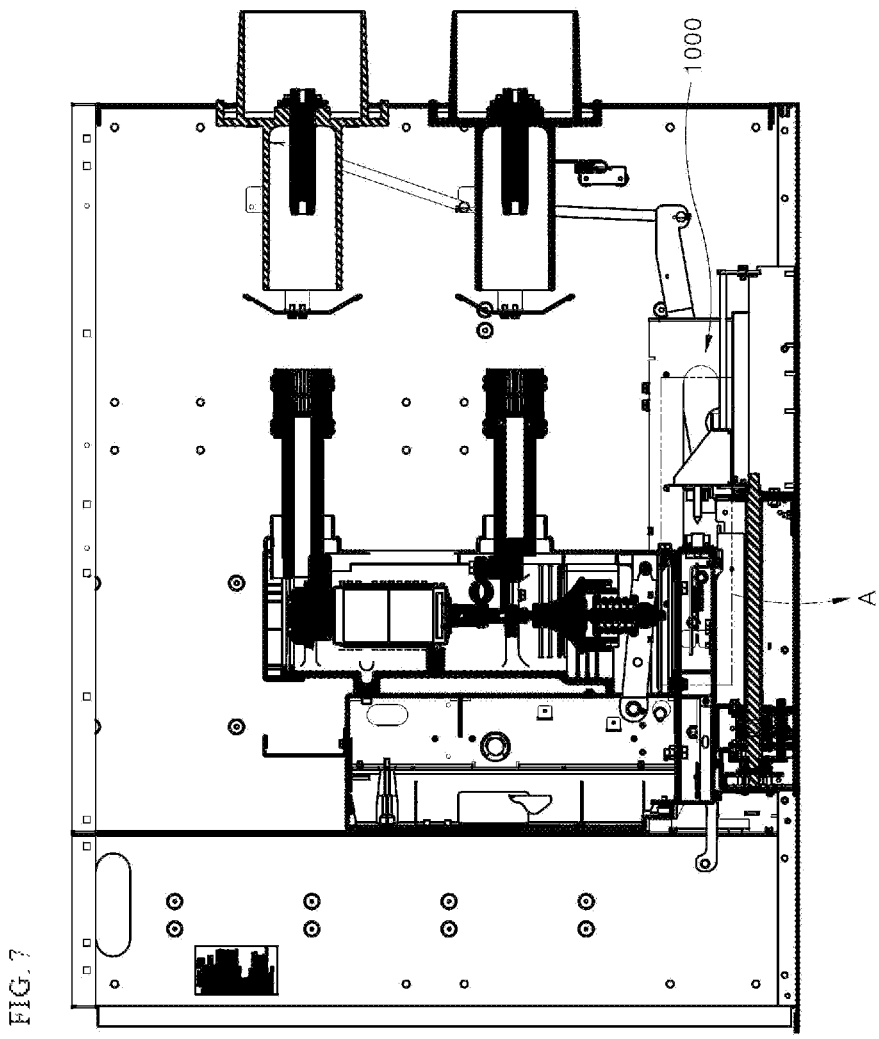
FIG. 7 is a cross-sectional view illustrating a side surface of the circuit breaker according to the embodiment.
Figure 8:
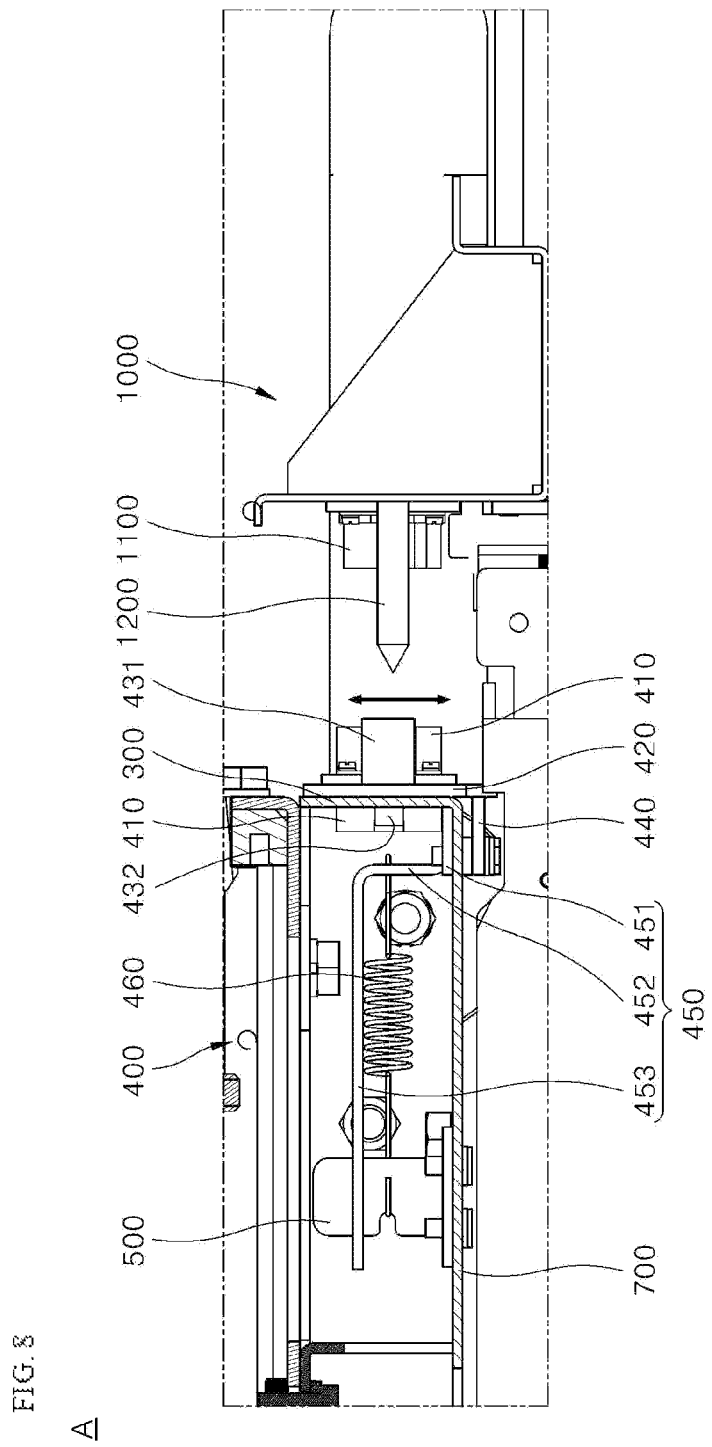
FIG. 8 is a view illustrating a state immediately before the connector assembly is coupled to a coupling assembly according to the embodiment.

FIG. 7 is a cross-sectional view illustrating a side surface of the circuit breaker 10 according to the embodiment. FIG. 8 is a view illustrating a state immediately before the connector assembly 400 is coupled to the coupling assembly 1000 according to the embodiment.

Figure 9:
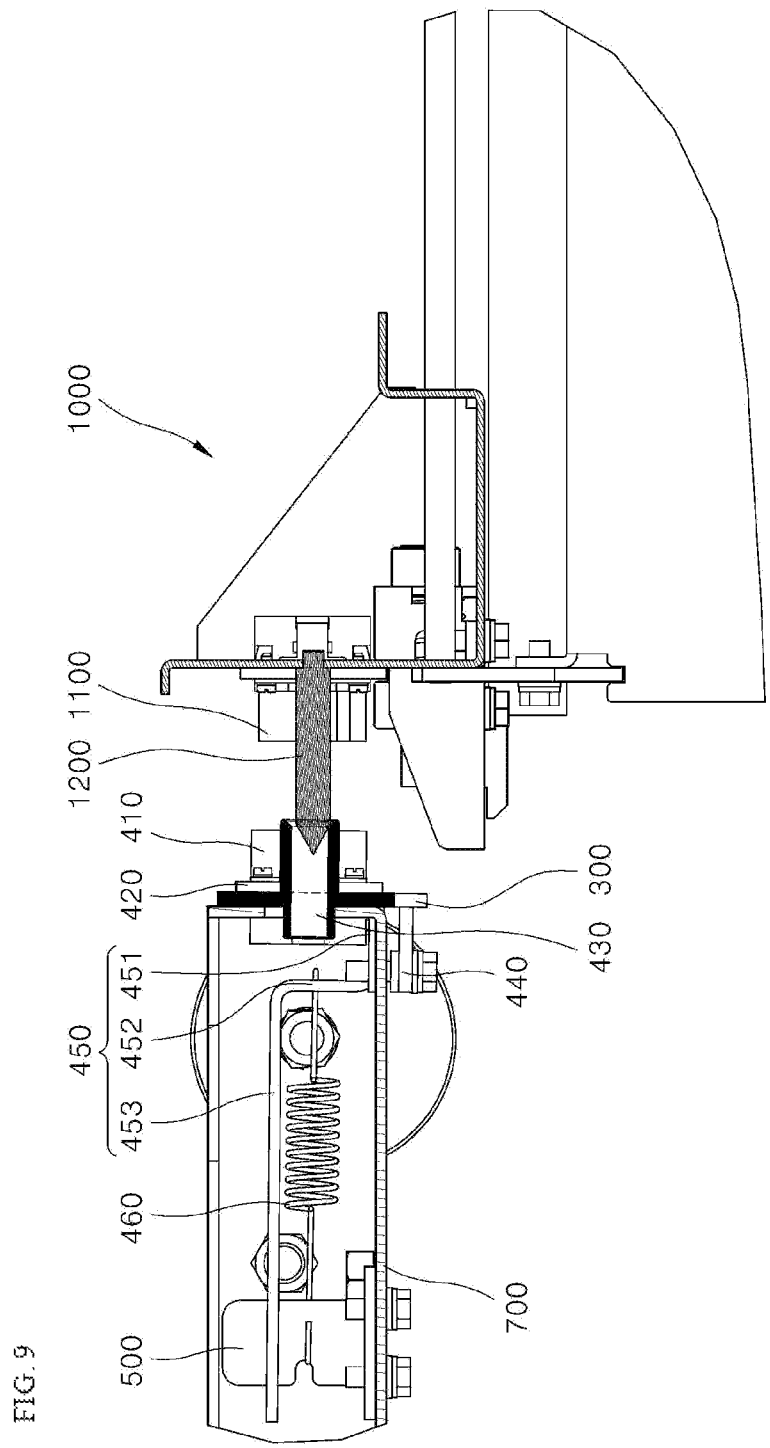
FIG. 9 is a view illustrating a moment when the connector assembly is coupled to the coupling assembly according to the embodiment.
Figure 10:
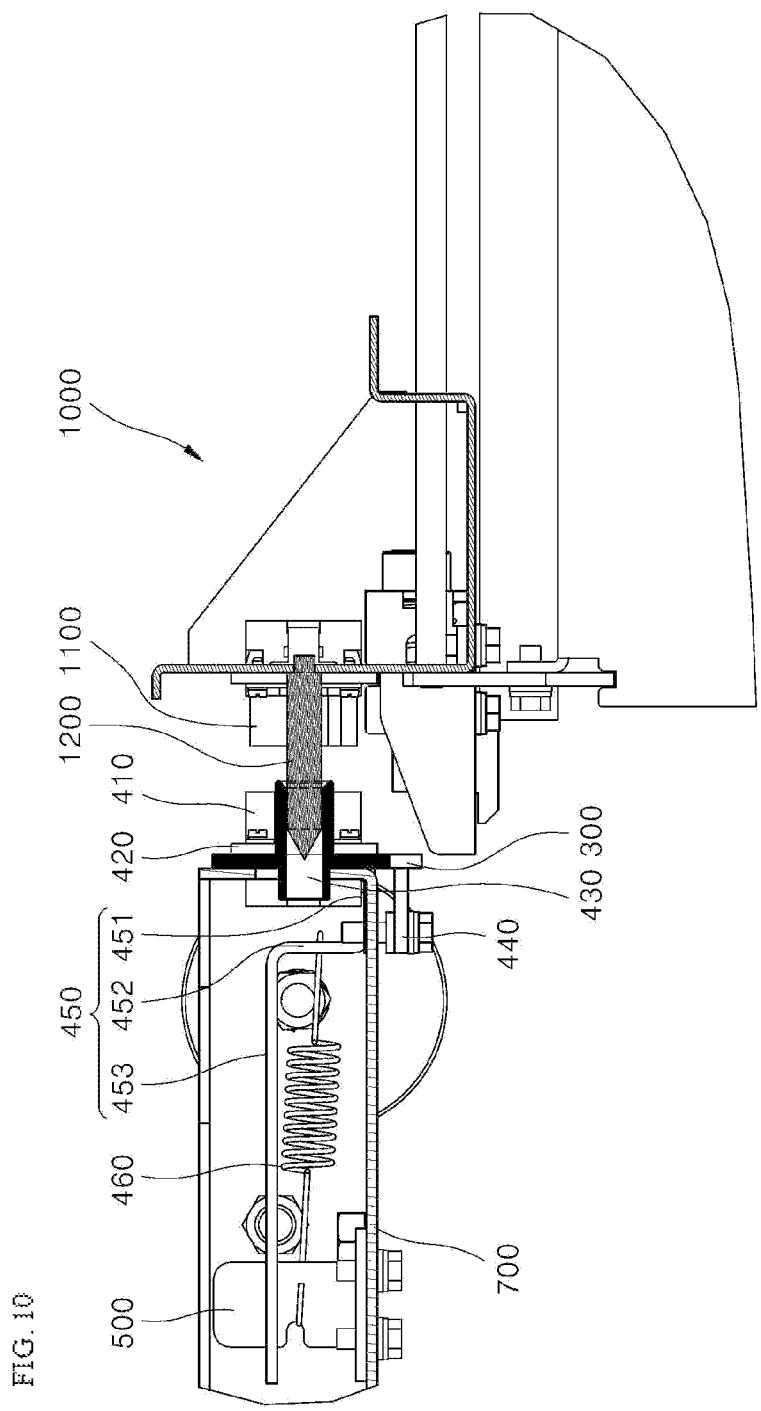
FIG. 10 is a view illustrating a state in which the connector assembly is coupled to the coupling assembly according to the embodiment.

FIG. 9 is a view illustrating a moment when the connector assembly 400 is coupled to the coupling assembly 1000 according to the embodiment. FIG. 10 is a view illustrating a state in which the connector assembly 400 is coupled to the coupling assembly 1000 according to the embodiment.

FIGS. 7 to 10 illustrate a process in which the connector assembly 400 and the coupling assembly 1000 are coupled in a state in which the connector assembly 400 and the coupling assembly 1000 are misaligned with each other in the vertical direction. For example, a process of coupling the connector assembly 400 and the coupling assembly 1000 in a state in which the connector assembly 400 is positioned on an upper side and the coupling assembly 1000 is positioned on a lower side is illustrated and will be described below.

The bogie apparatus 11 may move toward the coupling assembly 1000. In this case, the connector assembly 400 of the bogie apparatus 11 is positioned on an upper side of the coupling assembly 1000.

Referring to FIG. 9, the tip of the coupling pin 1200 may be formed as a cone-shaped inclined portion. Thus, when the tip of the coupling pin 1200 is inserted into the hollow of the guide bush 430, the guide bush 430 may be guided to the tip of the coupling pin 1200 formed as the inclined portion and may be lowered downward.

After the coupling pin 1200 of the coupling assembly 1000 is fitted in the hollow of the guide bush 430 of the connector assembly 400, when the bogie apparatus 11 moves toward the coupling assembly 1000, the socket part 410 and the guide bush 430 of the connector assembly 400 may be guided by the coupling pin 1200 and lowered downward by a predetermined distance. Due to this operation, the guide bush 430 and the coupling pin 1200 may be placed at positions corresponding to each other in the vertical direction, and the guide bush 430 is no longer lowered.

In this case, the socket part 410 may be lowered along the socket mounting hole 320 formed in the end bar 300, and the guide bush 430 may be lowered along the bush mounting hole 310 formed in the end bar 300 as a slot hole.

Referring to FIG. 10, when the bogie apparatus 11 moves closer to the coupling assembly 1000, the coupling pin 1200 is more deeply inserted into the guide bush 430, and accordingly, the socket part 410 of the connector assembly 400 and the coupling socket 1100 of the coupling assembly 1000 may be placed at positions corresponding to each other in the vertical direction. In this position, the socket part 410 and the coupling socket 1100 may be easily and smoothly coupled to each other.

When the bogie apparatus 11 moves closer to the coupling assembly 1000, the coupling pin 1200 may be completely inserted into the guide bush 430. At the same time, the socket part 410 provided as a male component may be inserted into the coupling socket 1100 provided as a female component, the coupling therebetween may be completed, and the connector assembly 400 and the coupling assembly 1000 may be coupled and electrically connected to each other.

Meanwhile, in contrast, even in a state in which the connector assembly 400 is positioned on the lower side and the coupling assembly 1000 is positioned on the upper side, the connector assembly 400 is mounted on the bogie apparatus 11 to be movable by a predetermined distance in the vertical direction, and thus it is obvious that the connector assembly 400 and the coupling assembly 1000 may be smoothly coupled to each other.

In an embodiment, the connector assembly 400 is provided in the bogie apparatus 11 to be movable in the vertical direction. Thus, even when the connector assembly 400 and the coupling assembly 1000 are misaligned with each other in the vertical direction, the connector assembly 400 and the coupling assembly 1000 may be smoothly coupled.

As described above, the present disclosure has been described with reference to the accompanying drawings, but the present disclosure is not limited by the embodiments disclosed in the present specification and the drawings, and various modifications may be made by those skilled in the art within the scope of the technical spirit of the present disclosure. In addition, although the effects according to the configuration of the present disclosure have not been explicitly described while the embodiments of the present disclosure are described, it is apparent that the effects predictable by the corresponding configuration should also be recognized.

The invention claimed is:

1. A bogie apparatus comprising:
   a transverse frame;
   a pair of longitudinal frames coupled to both ends of the transverse frame;
   an end bar having both ends coupled to ends of the longitudinal frames, the end bar having a bush mounting hole, the bush mounting hole is formed as a slot hole in which a major diameter of the bush mounting hole in a vertical direction is larger than a minor diameter of the bush mounting hole in a horizontal direction; and
   a connector assembly coupled to the end bar so as to be movable in at least the vertical direction,
   wherein the connector assembly includes:
      a socket part in which a plurality of wiring terminals are provided;
      a socket mounting part on which the socket part is mounted and which is provided in a plate shape; and
      a guide bush formed to protrude from the socket mounting part at a position spaced apart from the socket part and having a hollow,
   wherein the guide bushing is configured to be movable in the vertical direction when inserted into the bush mounting hole.

2. The bogie apparatus of claim 1, wherein a socket mounting hole on which the socket part is mounted is formed in the end bar, and
   a length of the socket mounting hole in the vertical direction is greater than a length of the socket part in the vertical direction.

3. The bogie apparatus of claim 1, wherein the connector assembly further includes:
   a connection plate formed to protrude rearward from the socket mounting part; and
   a connector bracket having one end coupled to the connection plate and another end coupled to a connector coupling part formed to protrude from a bottom surface of the bogie apparatus.

4. The bogie apparatus of claim 3, wherein the connector bracket includes:
   a first piece coupled to the connection plate;
   a second piece bent from the first piece; and
   a third piece bent from the second piece, having a lengthwise direction that is parallel to a front-rear direction of the bogie apparatus, and having an end coupled to the connector coupling part.

5. The bogie apparatus of claim 4, wherein a coupling part insertion hole is formed in the third piece, and an upper end of the connector coupling part is inserted into the coupling part insertion hole.

6. The bogie apparatus of claim 4, wherein the connector assembly further includes an elastic part having one end coupled to the second piece, another end coupled to the connector coupling part, and having a lengthwise direction that is disposed in the lengthwise direction of the third piece.

7. The bogie apparatus of claim 1, wherein the guide bush includes:
   a first mounting portion protruding forward from the socket mounting part; and
   a second mounting portion protruding rearward from the socket mounting part, and
   the second mounting portion is inserted into the bush mounting hole.

8. The bogie apparatus of claim 7, wherein at least a portion of the socket mounting part of the connector assembly is in contact with an outer surface of the end bar, and
   the connector assembly is mounted on the bogie apparatus to be movable relative to the end bar in the vertical direction.

9. A circuit breaker comprising:
   a body; and
   the bogie apparatus of claim 1, coupled to a lower portion of the body, wherein the bogie apparatus further includes a roller coupled to outer sides of the pair of longitudinal frames to be rotatable with respect to the longitudinal frames.

* * * * *